United States Patent [19]
Kushiro et al.

[11] Patent Number: 5,305,162
[45] Date of Patent: Apr. 19, 1994

[54] TAPE TENSIONING MECHANISM WITH TAPE LOADING-ACTIVATED TENSIONING PIN

[75] Inventors: Sunao Kushiro, Chiba; Masato Yamaguchi, Kanagawa; Keisuke Ikegami, Tokyo; Kenichi Fukahori, Kanagawa, all of Japan

[73] Assignee: Sony Corporation, Tokyo, Japan

[21] Appl. No.: 904,564

[22] Filed: Jun. 26, 1992

[30] Foreign Application Priority Data

Jun. 28, 1991 [JP] Japan .................... 3-184046

[51] Int. Cl.⁵ ............................. G11B 5/027
[52] U.S. Cl. ........................... 360/85; 360/95
[58] Field of Search ............. 360/85, 95, 96.5, 74.3

[56] References Cited

U.S. PATENT DOCUMENTS 4,661,864  4/1987  Kuwajima et al. .............. 360/95
5,025,332  6/1991  Tsuchida et al. ................ 360/85

FOREIGN PATENT DOCUMENTS

0092255  4/1987  Japan ........................ 360/74.3
0120654  6/1987  Japan ........................ 360/74.3
0295093 12/1991  Japan ........................ 360/74.3

Primary Examiner—Thomas E. Denion
Attorney, Agent, or Firm—Lewis H. Eslinger; Jay H. Maioli

[57] ABSTRACT

A video tape recorder having a tape tensioning mechanism for tensioning a magnetic tape drawn out of a tape cassette. The tape tensioning mechanism has a tensioning arm rotatably mounted on a movable Chassis, a tensioning pin for contacting the tape to tension the tape when the tape has been loaded in a predetermined tape path, a tightening lever movably mounted on the movable chassis, and a tension spring for urging the tensioning arm in a direction of rotation to bring the tensioning pin into contact with the tape. A pusher is fixedly mounted on a fixed chassis for pushing the tightening lever to tighten the tension spring substantially at the same time that the magnetic tape is loaded in the predetermined tape path. When the magnetic tape is not loaded in the tape path, the tightening lever is released from the pusher to loosen the tension spring.

4 Claims, 10 Drawing Sheets

TAPE TENSIONING MECHANISM WITH TAPE LOADING-ACTIVATED TENSIONING PIN

BACKGROUND OF THE INVENTION

1. Field of the Invention

The present invention relates to a tape tensioning mechanism, and more particularly to a tape tensioning mechanism for tensioning a magnetic tape in a magnetic tape recorder.

2. Description of the Prior Art

Magnetic tape recorders are required to transport a magnetic tape under a suitable tension which should be kept as constant as possible. In video tape recorders, particularly, it is important that a magnetic tape be held as stably as possible around a head drum while signals are being recorded on or reproduced from the magnetic tape. If the magnetic tape is not held under a suitable tension or is subject to tension fluctuations while it is being transported, then the magnetic tape will be wound unstably around the head drum.

Usually, the tape transport systems of magnetic tape recorders, typically video tape recorders, have a tape tensioning mechanism for keeping a magnetic tape under proper tension while it is being transported.

Many tape tensioning mechanisms comprise a tensioning pin for contacting a magnetic tape drawn out of a tape cassette when the magnetic tape has been loaded to pass through a predetermined path, an angularly movable tensioning arm which supports the pin, and a tension spring having one end coupled to the arm for urging the arm to turn in a direction to bring the pin into contact with the magnetic tape.

Figure 1:
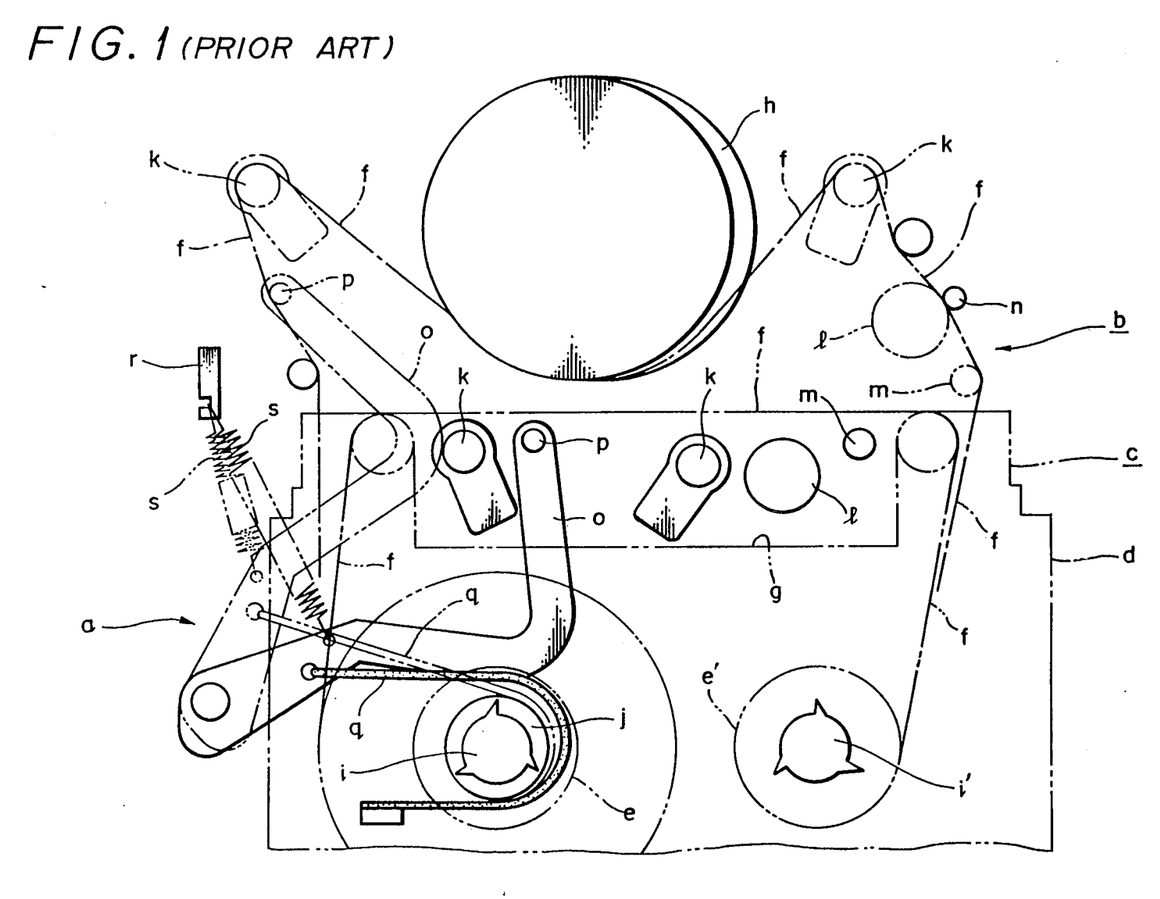
FIG. 1 is a schematic plan view of a conventional tape tensioning mechanism.

FIG. 1 of the accompanying drawings shows one such conventional tape tensioning mechanism, generally denoted at a.

As shown in FIG. 1, a tape cassette c placed in a video tape recorder b has a cassette case d and a pair of rotatable tape reels e, e' disposed in the cassette case d. The tape cassette c also has a magnetic tape f with opposite ends fixed to the respective tape reels e, e', the magnetic tape f being wound around the tape reels e, e'. Before a tape length between the tape reels e, e' is drawn out and loaded into a predetermined tape path within the video tape recorder b, it extends out of the cassette case d from tape outlets in opposite sides of a front face of the cassette case d and through a front recess g defined in the cassette case d.

The video tape recorder b includes a head drum h having rotary magnetic heads (not shown) movable along the outer circumferential surface thereof, and a pair of reel bases i, i' engaged by the respective tape reels e, e'. The reel base i engaged by one of the tape reels e is coupled to a brake drum j that is positioned beneath the tape base i.

The video tape recorder b also has a pair of movable guides k, k' for engaging and loading the magnetic tape f into the predetermined tape path, a pinch roller l, and a tape guide m. When the tape cassette c is inserted into the video tape recorder b, the movable guides k, k', the pinch roller l, and the tape guide m are positioned in the recess g. To load the magnetic tape f, the movable guides k, k', the pinch roller l, and the tape guide m are moved to a loading position indicated by the two-dot-and-dash lines. A certain length of the magnetic tape f is now drawn from the cassette case d into the tape path in which it is wound around the head drum h, with the pinch roller l pressing the magnetic tape f against a capstan n. The magnetic tape f can be transported along the tape path by the capstan n that is rotated at a constant speed and the pinch roller I held thereagainst.

A cylindrical tensioning pin p is mounted on one end of an angularly movable tensioning arm o whose other end is rotatably supported on a chassis (not shown) of the video tape recorder b. A resilient band q has one end fixed to the chassis and the other end coupled to the tensioning arm o at a position near the rotatably supported end thereof. The resilient band q has an intermediate portion to be wound around the brake drum j.

A tension spring s has one end engaged by a spring retainer r which is affixed to the chassis. The other end of the tension spring s engages the tensioning arm o near the resilient band g.

The tensioning arm o is normally urged to turn counterclockwise about its supported end under the tension of the tension spring s. Before the magnetic tape f is loaded into the tape path, the tensioning arm o is held in an initial position as indicated by the solid lines by the movable guide k that is positioned within the recess g.

To load the magnetic tape f, the movable guides k, k' are moved out of the recess g toward the position indicated by the two-dot-and-dash lines. The tensioning arm o is now released from the movable guide k and rotated counterclockwise under the tension of the tension spring s into a position indicated by the two-dot-and-dash lines. The tensioning pin p on the tensioning arm o is brought into resilient contact with the magnetic tape f thus loaded in a direction substantially perpendicular to the magnetic tape f. The intermediate portion of the resilient band q is now wound around the brake drum j.

The magnetic tape f is therefore tensioned by the tensioning pin p. It is assumed that the tape reel e serves as a supply reel and the tape reel e' as a take-up reel. The tape reel e' is rotated by a motor (not shown) coupled to the reel base i'. When the tension of the magnetic tape f increases while the magnetic tape f is being transported, it pushes the tensioning pin p to the right, turning the tensioning arm o clockwise thereby to loosen the resilient band q around the brake drum j. The load on the reel base i and the tape reel e as they rotate is reduced, and the angle through which the magnetic tape f is held in contact with the tensioning pin p is also reduced. Therefore, the tension which the magnetic tape f undergoes is reduced. Conversely, when the tension of the magnetic tape f decreases while the magnetic tape f is being transported, it allows the tensioning pin p to move to the left, turning the tensioning arm o counterclockwise thereby to tighten the resilient band g around the brake drum j. The load on the reel base i and the tape reel e as they rotate is increased, and the angle through which the magnetic tape f is held in contact with the tensioning pin p is also increased. Therefore, the tension which the magnetic tape f undergoes becomes larger.

Consequently, the magnetic tape f is kept under a substantially constant tension during the transport thereof along the tape path from the tape reel e to the tape reel e'.

However, the tension spring s of the conventional tape tensioning mechanism a is required to be relatively large, i.e., have a large diameter and a large number of turns. More specifically, while the tensioning pin p is held in contact with the magnetic tape f, the tension spring s is required to be slightly stretched, i.e., to store an amount of energy large enough to bias the tensioning arm o to press the tensioning pin p lightly against the magnetic tape f. In the initial state prior to the loading of the magnetic tape f, however, the tensioning arm o is displaced far away from the position it takes when the magnetic tape f is loaded. As shown in FIG. 1, the tension spring s in the initial state is considerably longer than it is when the magnetic tape f is loaded. Thus, the tension spring s is actually required to store an amount of energy large enough to rotate the tensioning arm o from the initial position indicated by the solid lines to the position indicated by the two-dot-and-dash lines, and hence to have a large diameter and a large number of turns.

The relatively large tension spring s has heretofore been one of the mechanical limitations which have prevented the tape tensioning mechanism from being reduced in size.

OBJECTS AND SUMMARY OF THE INVENTION

It is an object of the present invention to provide a tape tensioning mechanism which is relatively small in size.

According to the present invention, there is provided a tape tensioning mechanism for tensioning a tape drawn out of a tape cassette, comprising a fixed chassis, a movable chassis movably mounted on the fixed chassis and movable into a retracted position with respect to the fixed chassis, guide means on the fixed and movable chassis for defining a predetermined tape path to load the tape therein when the movable chassis is moved into the retracted position, a tensioning arm rotatably mounted on the movable chassis and having a tensioning pin for contacting the tape to tension the tape when the tape has been loaded in the predetermined tape path, a tightening lever movably mounted on the movable chassis, a tension spring for normally urging the tensioning arm to rotate in a direction to bring the tensioning pin into contact with the tape, the tension spring having one end coupled to the tensioning arm and an opposite end coupled to the tightening lever, and pushing means mounted on the fixed chassis for engaging and moving the tightening lever to tighten the tension spring substantially at the same time that the tape is loaded in the predetermined tape path when the movable chassis is moved into the retracted position, and for releasing the tightening lever to loosen the tension spring when the movable chassis is out of the retracted position.

The tightening lever is rotatably supported on the movable chassis, the opposite end of the tensioning spring being coupled to one end of the tightening lever. The pushing means comprises a pusher fixedly mounted on the fixed chassis and positioned to push an opposite end of the tightening lever to turn the tightening lever to tighten the tension spring when the movable chassis is moved into the retracted position.

The tension spring is not required to bias the tensioning arm when the magnetic tape is unloaded and is only required to bias the tensioning arm when the magnetic tape is loaded in the tape path. Therefore, the tension spring may be of a relatively small size, and hence the tape tensioning mechanism may also be relatively small in size.

The above and other objects, features, and advantages of the present invention will become apparent from the following description of an illustrative embodiment thereof to be read in conjunction with the accompanying drawings, in which like reference numerals represent the same or similar objects.

DETAILED DESCRIPTION OF THE PREFERRED EMBODIMENT

A tape tensioning mechanism according to the present invention is particularly useful when embodied in a video tape recorder which uses tape cassettes according to the 8 mm video standards and includes two tape reels whose interaxial distance can be increased and reduced.

FIGS. 2 through 5 show such a video tape recorder, generally designated by the reference numeral 1, which incorporates a tape tensioning mechanism according to the present invention.

Figure 4:
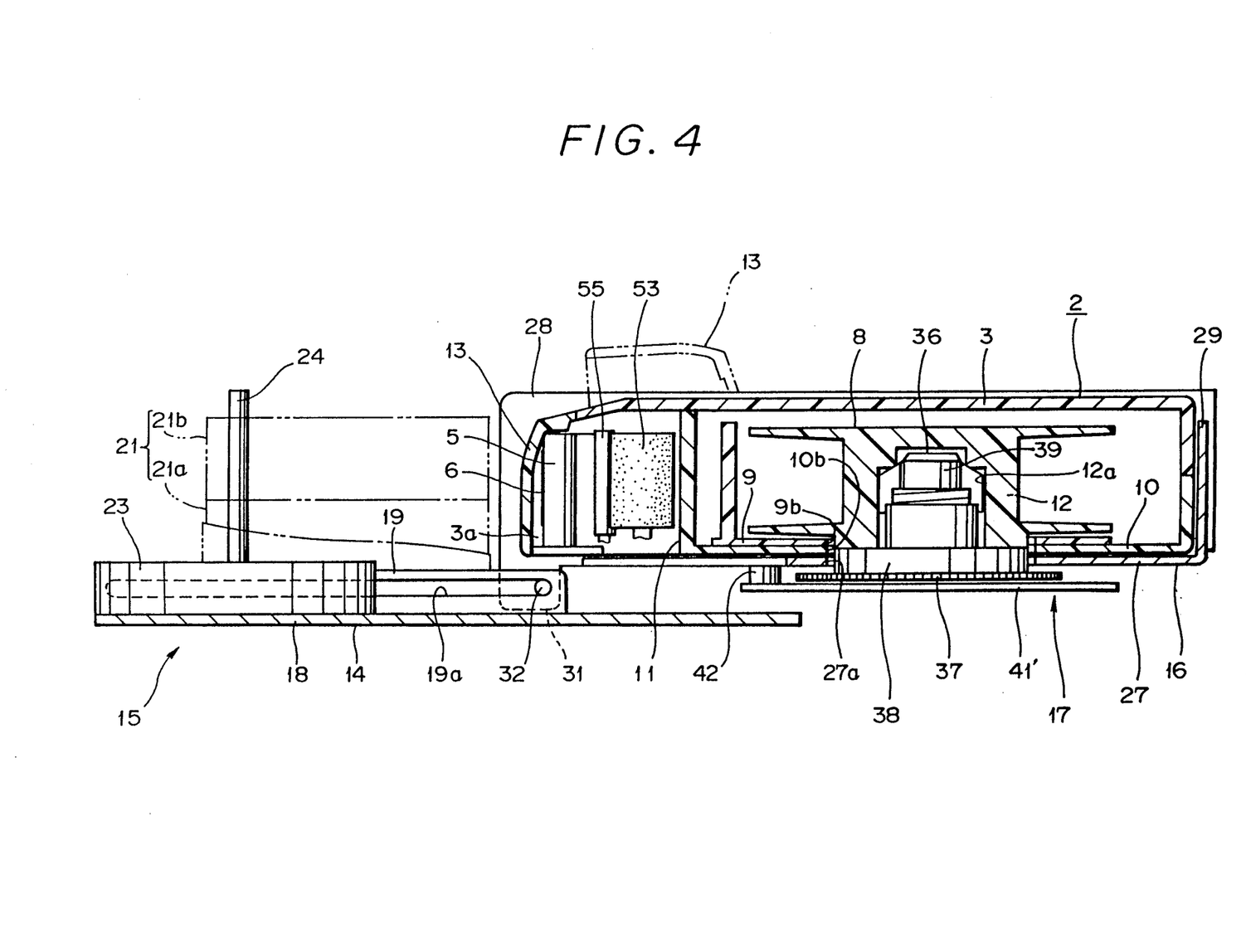
FIG. 4 is an enlarged cross-sectional view taken along line IV—IV of FIG. 2.
Figure 5:
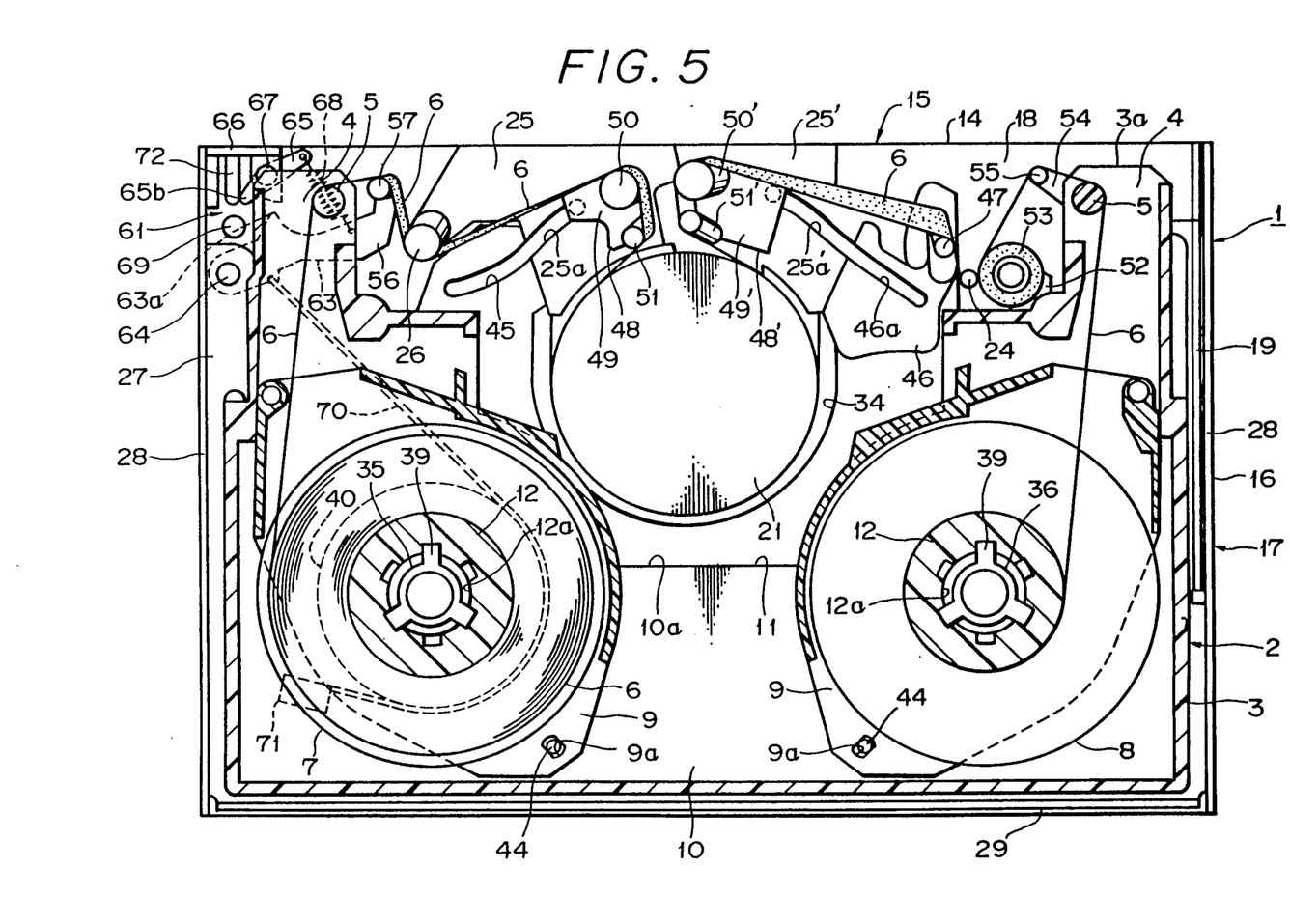
FIG. 5 is an enlarged plan view, partly in cross section, of the video tape recorder with a magnetic tape loaded.

As better shown in FIGS. 4 and 5, the video tape recorder 1 uses a tape cassette 2 having a cassette case 3 in the form of a rectangular box of a relatively low profile. The cassette case 3 is composed of two half members each in the shape of a rectangle as viewed in the transverse direction thereof. The cassette case 3 has a pair of laterally spaced tape outlets 4 defined in opposite sides of a front face 3a thereof. The tape cassette 2 has a pair of tape guides 5 disposed respectively in the tape outlets 4 and extending in the transverse direction of the cassette case 3.

The cassette case 3 houses a pair of rotatable tape reels 7, 8 with a magnetic tape 6 wound therearound. The tape reel 7 serves as a supply reel, and the tape reel 8 as a take-up reel. The tape reels 7, 8 are movably disposed in the cassette case 3 such that their interaxial distance can be increased and reduced.

The tape reels 7, 8 are rotatably supported respectively on reel holder plates 9 that are positioned on opposite sides of a bottom panel 10 of the cassette case 3. The reel holder plates 9 have front ends rotatably supported on the bottom panel 10. The reel holder plates 9 are movable between a standard position in which the axial distance between the tape reels 7, 8 is equal to a standard interaxial distance according to the 8 mm video specifications, and a spread position in which the axial distance between the tape reels 7, 8 becomes an increased interaxial distance that is larger than the standard interaxial distance according to the 8 mm video specifications. The reel holder plates 9 are normally kept in the standard position except when they are moved into the spread position by the video tape recorder 1. The reel holder plates 9 have respective holes 9a defined in ends thereof remote from the rotatably supported front ends thereof.

The magnetic tape 6 as it leaves the supply reel 7 goes around one of the tape guides 5, extends out of the cassette case 3, is guided around the other tape guide 5, enters the cassette case 3, and goes to the take-up reel 8. Therefore, a length of the magnetic tape 6 is kept taut between the two tape guides 5 and extends along the front face 3a of the cassette case 3.

The bottom panel 10 of the cassette case 3 has a large recess 10a defined in a front portion thereof behind the magnetic tape length extending between the tape guides 5. The recess 10a is substantially of a trapezoidal shape spreading toward the front face 3a. The recess 10a is exposed in its entirety when the reel holder plates 9 move to the spread position, as shown in FIG. 5.

The cassette case 3 has an interior space 11 coextensive with the recess 10a. The interior space 11 serves as a mouth 11 to receive therein a head drum and other components of the video tape recorder 1 when the tape cassette 2 is inserted into the video tape recorder 1 for recording or reproducing signals.

The tape reels 7, 8 have respective hubs 12 around which the magnetic tape 6 is wound. The hubs 12 have lower ends rotatably positioned in respective reel support holes 9b defined respectively in the reel holder plates 9. The lower ends of the hubs 12 also project out of the cassette case 3 through respective oblong holes 10b defined in the bottom panel 10 (see FIG. 4).

The tape cassette 2 has a lid 13 for opening and closing the front face 3a of the cassette case 3. The lid 13 is rotatably between a closed position, as indicated by the solid lines in FIG. 4, in which the lid 13 covers the front side of the magnetic tape 6 extending between the tape guides 5, and an open position, as indicated by the two-dot-and-dash lines, in which the lid 13 is lifted to expose the front side of the magnetic tape 6. The lid 13 is moved into the open position by a lid opening mechanism of the video tape recorder 1. The lid 13 remains in the closed position when not actuated by the lid opening mechanism.

The tape cassette 2 is inserted into the video tape recorder 1 while the front face 3a of the cassette case 3 is covered by the lid 13 and the tape reels 7, 8 are spaced from each other by the standard interaxial distance.

Figure 2:
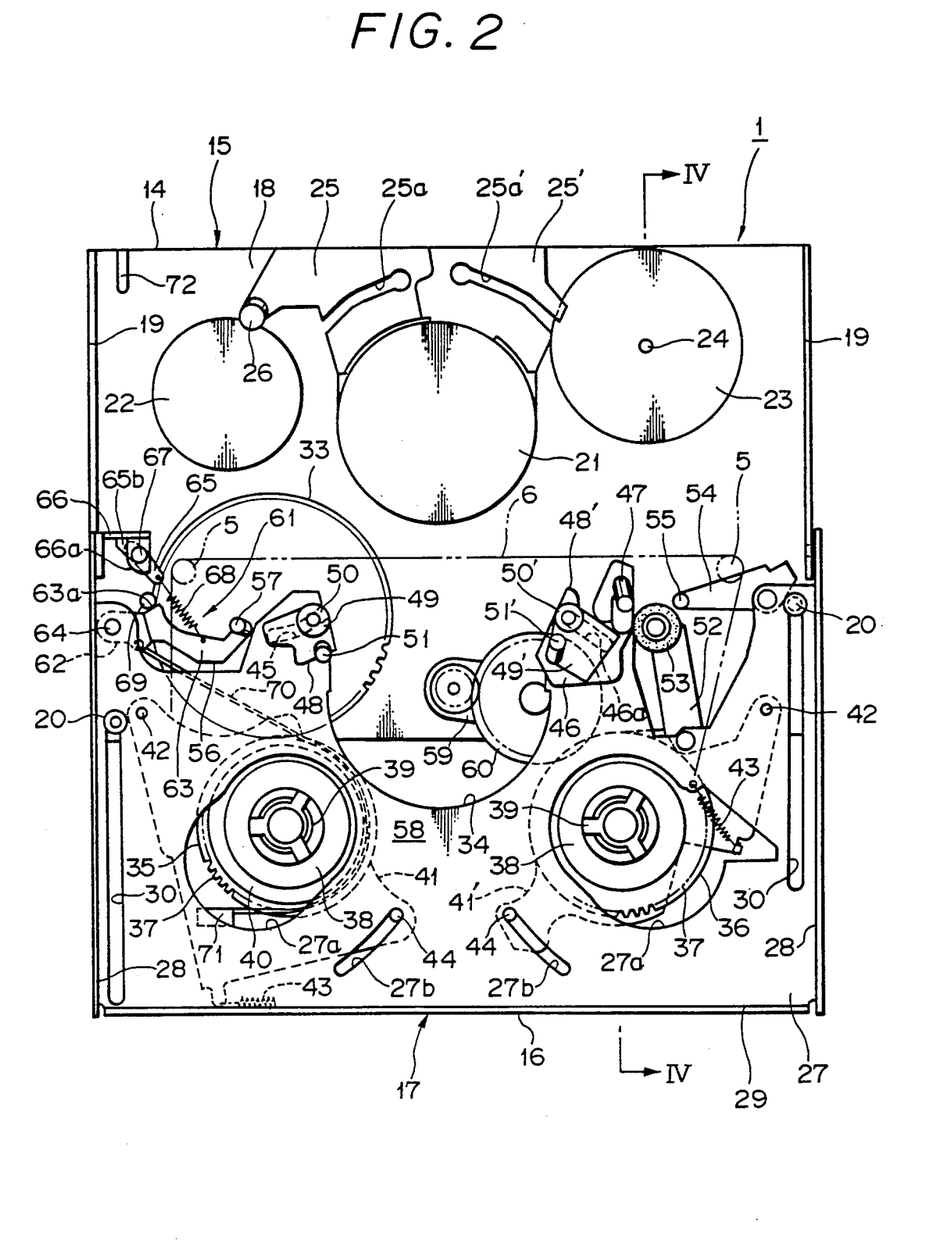
FIG. 2 is a plan view of a video tape recorder incorporating a tape tensioning mechanism according to the present invention.
Figure 3:
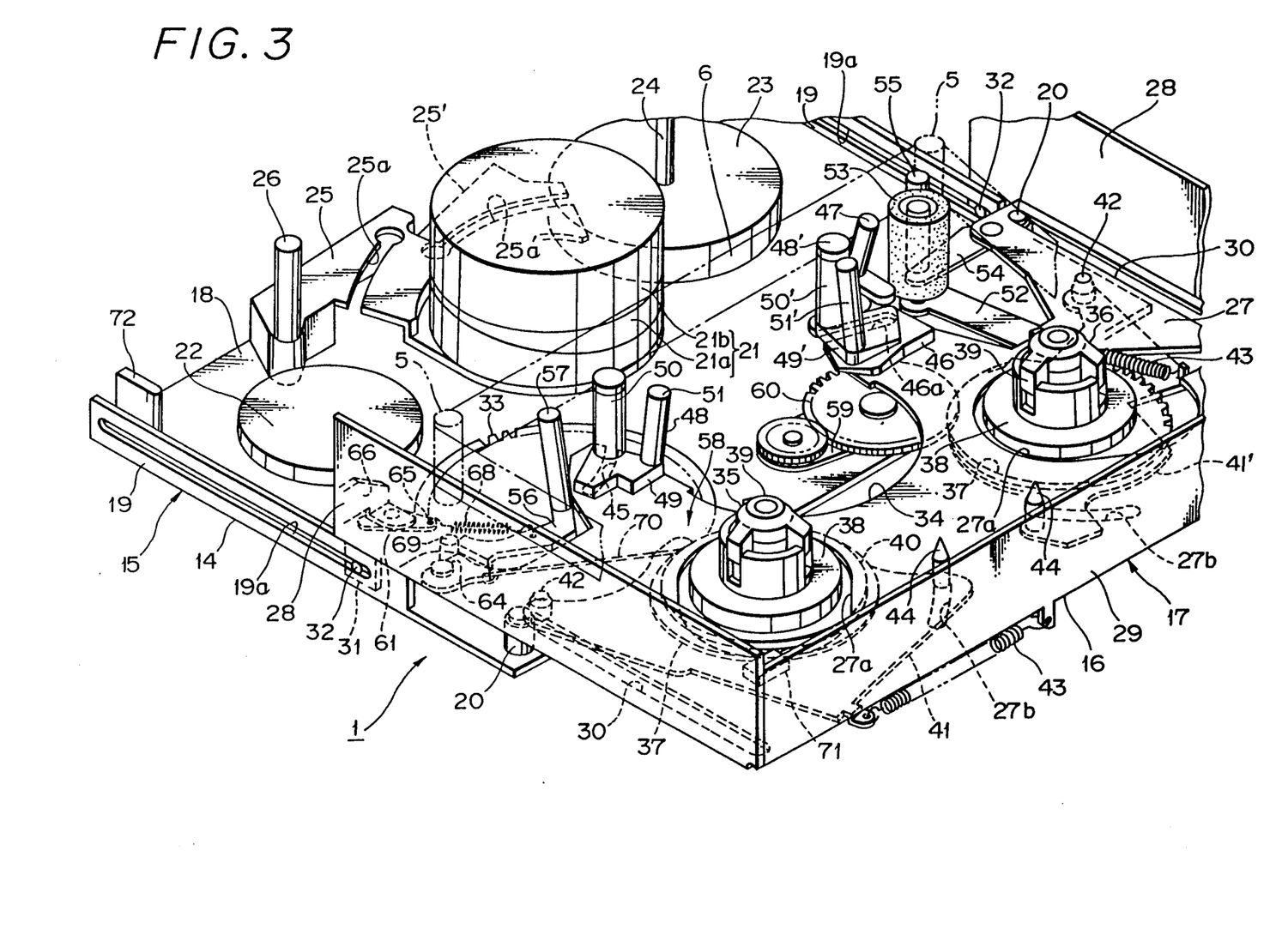
FIG. 3 is an enlarged fragmentary perspective view of the video tape recorder shown in FIG. 2.

As better shown in FIGS. 2 and 3, the video tape recorder 1 basically comprises a stationary assembly 15 including a fixed chassis 14 and a movable assembly 17 including a slidable chassis 16.

The terms "left", "right", and similar words used herein with respect to the video tape recorder 1 and the tape cassette 2 are referred to with reference to FIG. 2. The front and rear sides of the video tape recorder 1 are directed downwardly and upwardly, respectively, in FIG. 2, and the front and rear sides of the tape cassette 2 are directed upwardly and downwardly, respectively, in FIG. 2.

The fixed chassis 14 has a two-dimensional size, as viewed in plan, which is slightly larger than that of the tape cassette 2. The fixed chassis 14 comprises a flat base panel 18 of a rectangular shape which is elongated between its left and right edges, and a pair of upstanding guide walls 19 extending upwardly from the left and right edges, respectively, of the base panel 18. The guide walls 19 have respective guide grooves 19a defined therein and extending longitudinally between their front and rear ends. Two upstanding guide posts 20 are mounted respectively on left and right ends of the front end of the base panel 18. The guide posts 20 have a height which is about one-third of the thickness of the tape cassette 2.

A head drum assembly 21 is fixedly mounted on the upper surface of the base panel 18 in its central region near the rear end thereof. A main motor 22 is fixedly mounted on the base panel 18 on the lefthand side of the head drum assembly 21, and a capstan motor 23 is fixedly mounted on the base panel 18 on the righthand side of the head drum assembly 21. The capstan motor 23 has a capstan 24 projecting upwardly as its rotatable output shaft.

The stationary assembly 15 also has a pair of guide members 25, 25' for guiding tape loading blocks (described later on). The guide members 25, 25' are disposed behind the head drum assembly 21 and held in substantial contact with the head drum assembly 21. The guide members 25, 25' are slanted upwardly toward their righthand ends. The guide members 25, 25' have respective guide grooves 25a, 25a' defined therein. An upwardly projecting fixed tape guide 26 is fixed to the lefthand end of the left guide member 25, and is slightly inclined forwardly.

As shown in FIG. 4, the head drum assembly 21 comprises a fixed drum 21a fixed to the fixed chassis 14, a rotary drum 21b rotatably supported on the fixed drum 21a, and a plurality of rotary magnetic heads (not shown) positioned between the fixed and rotary drums 21a, 21b and supported by the rotary drum 21b for movement along the outer circumferential surface of the head drum assembly 21. When signals are recorded on and reproduced from the magnetic tape 6, the rotary drum 21b is rotated at high speed by a drum motor (not shown).

The remaining components of the stationary assembly 15 will be described later on.

As shown in FIGS. 2 and 3, the slidable chassis 16 comprises a flat base panel 27 which is of substantially the same size as the base panel 18 of the fixed chassis 14, a pair of upstanding side walls 28 extending respectively from the left and right edges of the base panel 27, and an upstanding front wall 29 extending from the front edge of the base panel 27. The base panel 27 has a pair of guide grooves 30 defined therein and extending along the left and right edges thereof. Tabs 31 project downwardly from the lower edges of the rear ends of the side walls 28, and have respective guide pins 32 projecting to the left.

The guide pins 32 are slidably fitted in the guide grooves 19a of the fixed chassis 14, and the guide posts 20 of the fixed chassis 14 have upper ends slidably fitted respectively in the guide grooves 30 of the slidable chassis 16. Therefore, the slidable chassis 16 is supported on the fixed chassis 14 at a position higher than the fixed chassis 14 and slidable therealong in forward and rearward directions with respect to the fixed chassis 14.

The slidable chassis 16 is movable between a projected position in which the rear end thereof confronts the front end of the fixed chassis 14, as shown in FIG. 2, and a retracted position in which the slidable chassis 16 in its entirety confronts the fixed chassis 14, as shown in FIG. 5. The slidable chassis 16 is moved between the projected and retracted positions by the main motor 22 and a drive mechanism which includes a cam gear 33 mounted on the fixed chassis 14.

The base panel 27 of the slidable chassis 16 has a relatively large substantially U-shaped recess 34 defined centrally in its rear end portion and opening rearwardly. When the slidable chassis 16 moves to the retracted position, the head drum assembly 21 is positioned in the recess 34, as shown in FIG. 5.

The tape reels 7, 8 are engaged by respective reel bases 35, 36 which comprise respective spur gears 37, respective substantially circular reel rests 38 positioned slightly above the spur gears 37, and respective reel shafts 39 projecting upwardly from the centers of the reel rests 38. The reel base 35 has a brake drum 40 positioned axially between the spur gear 37 and the reel rest 38.

Portions of the reel bases 35, 36 above the reel rests 38 project upwardly from the base panel 27 of the slidable chassis 16. The reel bases 35, 36 are movable with respect to each other such that their interaxial distance can be increased and reduced.

The reel bases 35, 36 are supported respectively by flat reel base levers 41, 41'. The left reel base lever 41 is of a rectangular shape that is elongate substantially between the front and rear ends of the slidable chassis 16. The right reel base lever 41' is of a crank shape that is elongate substantially between the front and rear ends of the slidable chassis 16.

These reel base levers 41, 41' are positioned slightly below the base panel 27, and horizontally located underneath lefthand and righthand portions, respectively, of a front portion of the base panel 27. The reel base levers 41, 41' have respective rear ends horizontally angularly movably supported on respective support shafts 42 that project downwardly from the base panel 27. In an initial state, i.e., before the slidable chassis 16 moves into held in an initial position shown in FIG. 2 under the bias of respective tension springs 43 engaging between the reel base levers 41, 41' and the slidable chassis 16, so that the interaxial distance between the reel bases 35, 36 is the same as the standard interaxial distance referred to above. When the slidable chassis 16 starts moving toward the retracted position, the reel base levers 41, 41' move toward a spread position in which the interaxial distance between the reel bases 35, 36 is the same as the increased interaxial distance, also referred to above, greater than the standard interaxial distance. The movement of the reel base levers 41, 41' is also effected by the drive mechanism including the cam gear 33.

The base panel 27 has relatively large oblong holes 27a defined between the central region and the left and right ends thereof. The portions of the reel bases 35, 36 above the reel rests 38 project upwardly through the holes 27a, respectively.

Pins 44 are upwardly disposed on the distal ends, respectively, of the reel base levers 41, 41', and project upwardly through respective arcuate slots 27b which are defined in the base panel 27 about the support shafts 42, respectively.

The base panel 27 also has a relatively short guide groove 45 defined therein on the lefthand side of the recess 34, the guide groove 45 extending substantially laterally as viewed in FIG. 2 and having a righthand end opening into the recess 34. A support seat 46 is attached to the base panel 27 on the righthand side of the recess 34. The support seat 46 has a relatively short guide groove 46a defined therein and has a lefthand opening into the recess 34. An upstanding oblique guide 47 is fixedly mounted on the rear end of the support seat 46, the guide 47 being slightly inclined forwardly.

Tape loading blocks 48, 48' for loading the magnetic tape 6 comprise respective movable bases 49, 49', and respective guide rollers 50, 50' and respective oblique guides 51, 51' which are supported on the movable bases 49, 49'. The tape loading blocks 48, 48' are movably supported in the respective left and right guide grooves 45, 46a prior to arrival of the slidable chassis 16 at the retracted position.

An upstanding pinch roller 53 is rotatably supported on one end of a pinch roller arm 52. An upstanding tape guide 55 is supported on one end of a tape guide arm 54. An upstanding tensioning pin 57 is mounted on one end of a tensioning arm 56. The pinch roller arm 52, the tape guide arm 54, and the tensioning arm 56 are rotatably supported at their respectively ends on the slidable chassis 16 opposite to the ends where the pinch roller, type guide, and tensioning arm, respectively, are supported. In the initial state, i.e., when the slidable chassis 16 is in the projected position, the pinch roller 53 is positioned on the righthand side of the right tape loading block 48', the tape guide 55 substantially on the righthand side of the pinch roller 53, and the tensioning pin 57 on the lefthand side of the left tape loading block 48, as shown in FIG. 2.

The remaining components of the movable assembly 17 will be described later on. The tensioning arm 56 and the tensioning pin 57 are part of the tape tensioning mechanism according to the present invention which will be described in detail later on.

The reel bases 35, 36 and other components described above of the movable assembly 17 are disposed in an inner space 58 of the slidable chassis 16. The tape cassette 2 is removably placed in the space 58.

The tape cassette 2 can be placed in and removed from the space 58 while the slidable chassis 16 is in the projected position.

When the tape cassette 2 is placed in the space 58, the reel shafts 39 of the reel bases 35, 36 are inserted into respective holes 12a in the hubs 12 of the tape reels 7, 8, resulting in engagement for corotation between the tape reel 7 and the reel base 35 and also between the tape reel 8 and the reel base 36.

The upstanding pins 44 on the reel base levers 41, 41' are also inserted respectively into the holes 9a in the reel holder plates 9. Therefore, the reel holder plate 9 which supports the tape reel 7 is coupled with the reel base lever 41 for movement in unison with each other, and the reel holder plate 9 which supports the tape reel 8 is coupled with the reel base lever 41' for movement in unison with each other.

When the tape cassette 2 is placed in the space 58, the guide rollers 50, 50', the oblique guides 51, 51', the pinch roller 53, the tape guide 55, and the tensioning pin 57 are positioned substantially near the rear side of the slidable chassis 17 abutting the length of the magnetic tape 6 positioned on the front side of the cassette case 3 (see FIGS. 2 and 3).

The slidable chassis 17 has a cover (not shown) which openably covers the space 58 after the tape cassette 2 is placed in the space 58. In response to a closing movement of the cover, the lid 13 of the tape cassette 2 is moved into the open position, and the cassette case 3 is pressed against the upper surface of the base panel 27 of the slidable chassis 16.

After the tape cassette 2 is thus placed in the space 58, a command is issued to retract the slidable chassis 16 into the retracted position. First, the reel base levers 41, 41' move into the spread position together with the reel holder plates 9, with a resultant increase in the interaxial distance between the tape reels 7, 8. Thereafter, the slidable chassis 16 starts moving into the retracted position.

Upon movement of the slidable chassis 16 into the retracted position, the head drum assembly 21 is inserted into the mouth 11, and has its front end positioned between the tape reels 7, 8. At the same time, the magnetic tape 6 is wound around a substantially front portion of the outer circumferential surface of the head drum assembly 21, the guide rollers 50, 50', the fixed tape guide 26, the fixed oblique guide 47, and the capstan 24.

When the slidable chassis 16 reaches the retracted position, the left guide groove 45 of the slidable chassis 16 registers with the guide groove 25a in the guide member 25, and the right guide groove 46a in the support base 46 of the slidable chassis 16 registers with the guide groove 25'a in the guide member 25'.

Then, the left loading block 48 move in and along the guide grooves 45, 25a to a loaded position substantially immediately behind the head drum assembly 21, and the right loading block 48' move in and along the guide grooves 46a, 25a' to a loaded position substantially immediately behind the head drum assembly 21.

Since the guide grooves 25a, 25a' are slanted upwardly to the righthand ends, the left tape loading block 48 is vertically displaced up to a position slightly higher than the tape outlets 4 of the tape cassette 2, and the right tape loading block 48' is vertically displaced down to a position slightly lower than the tape outlets 4.

When the slidable chassis 16 begins to move toward the retracted position, the tape guide arm 54 is turned slightly rearwardly by a guide cam (not shown) on the fixed chassis 14, causing the magnetic tape 6 to pass around the tape guide 55. The tensioning arm 56 is released from its initial position, and turned substantially rearwardly under the tension of a tension spring (described later on). The magnetic tape 6 is now wound around the tensioning pin 57, and tensioned thereby under a force which tends to turn the tensioning pin 57.

Substantially at the same time that the slidable chassis 16 reaches the retracted position, the pinch roller arm 52 is turned slightly to the right by a cam (not shown) on the fixed chassis 14 to enable the pinch roller 53 to press the magnetic tape 6 against the capstan 24.

Now, the magnetic tape 6 is fully loaded for transport along a predetermined tape path. Along the tape path, the magnetic tape 6 is unreeled from the supply reel 7, travels to the left tape guide 5 to the tensioning pin 57 to the fixed tape guide 26 to the guide roller 50 to the oblique guide 51 to the head drum assembly 21 to the oblique guide 51' to the guide roller 50' to the oblique guide 47 to the capstan 24 to the tape guide 55 to the right guide 5, and is wound around the take-up reel 8. The magnetic tape 6 is wound substantially fully around the head drum assembly 21 in a helical pattern, i.e., along a gradually downward circular path from a start-of-winding position on the head drum assembly 21 near the left oblique guide 51 toward an end-of-winding position on the head drum assembly 21 near the right oblique guide 51'. The magnetic tape 6 is displaced gradually upwardly as it travels from the tensioning pin 57 to the left oblique guide 51, and also as it moves from the right oblique guide 51' to the oblique guide 47.

Desired signals are recorded on or reproduced from the magnetic tape 6 by the rotary magnetic heads of the head drum assembly 21 while the magnetic tape 6 is being transported by the capstan 24 and the pinch roller 53 and the rotary drum 21b of the head drum assembly 21 is rotating.

As shown in FIGS. 2 and 3, a swing lever 59 is swingably mounted on the upper surface of the fixed chassis 14 substantially central at its front end. The swing lever 59 supports on its distal end an idler gear 60 which is rotatable by the capstan motor 23. When the magnetic tape 6 runs in a normal direction, i.e., from the supply reel 7 to the take-up reel 8, the idler gear 60 is held in mesh with the gear 37 of the reel base 36, as shown, for rotating the reel base 36 clockwise to wind the magnetic tape 6. When the magnetic tape 6 runs in a reverse direction, i.e., from the take-up reel 8 to the supply reel 7, the idler gear 60 is held in mesh with the gear 37 of the reel base 36 for rotating the reel base 36 counterclockwise to wind the magnetic tape 6.

To remove the tape cassette 2 from the video tape recorder 1, the slidable chassis 16 is moved into the projected position, and the magnetic tape 6 is unloaded and wound around the supply reel 7. More specifically, the tape loading blocks 48, 48' are moved into the guide grooves 45, 46a of the slidable chassis 16, and the slidable chassis 16 returns to the projected position. The head drum assembly 21 is moved out of the mouth 11 of the tape cassette 2, and the pinch roller 53, the tape guide 55, and the tensioning pin 57 are moved back to their positions in the initial state. At the same time that the tape loading blocks 48, 48' are moved onto the slidable chassis 16 as described above, the supply reel 7 is rotated in a direction to wind the magnetic tape 6, which is wound on the supply reel 7 without sagging.

As also shown in FIGS. 6 through 10, the tape tensioning mechanism, generally designated by the reference numeral 61, comprises the tensioning arm 56, the tensioning pin 57, a tightening lever 65 rotatably supported on the slidable chassis 16, a tension spring 68 coupled between the tensioning lever 56 and the tightening lever 65, a tensioning band 70 wound around the brake drum 40 of the reel base 35, and a pusher 72 mounted on the fixed chassis 14.

The tensioning arm 56 is in the form of a plate that is elongated laterally with respect to the slidable chassis 16. The tensioning arm 56 has a lefthand end 62 lower than the remainder thereof and angularly movably supported by a support shaft 64 projecting downwardly from the rear end of the lefthand end of the base panel 27. The remaining portion, denoted at 63, of the tensioning arm 56 lies at substantially the same height as the base panel 27.

The tensioning pin 57, which is of a cylindrical shape, is upwardly mounted on the distal end of the tensioning arm 56. The tensioning pin 57 is slightly inclined to the left.

The portion 63 of the tensioning arm 56 has a rear side edge 63a on the lefthand end thereof which faces substantially rearwardly and leftwardly. The portion 63 also has a spring retainer hole 63b defined therein near the distal end thereof. The lefthand end 62 of the tensioning arm 56 has a band coupling hole 62a defined in the righthand end thereof.

Figure 7:
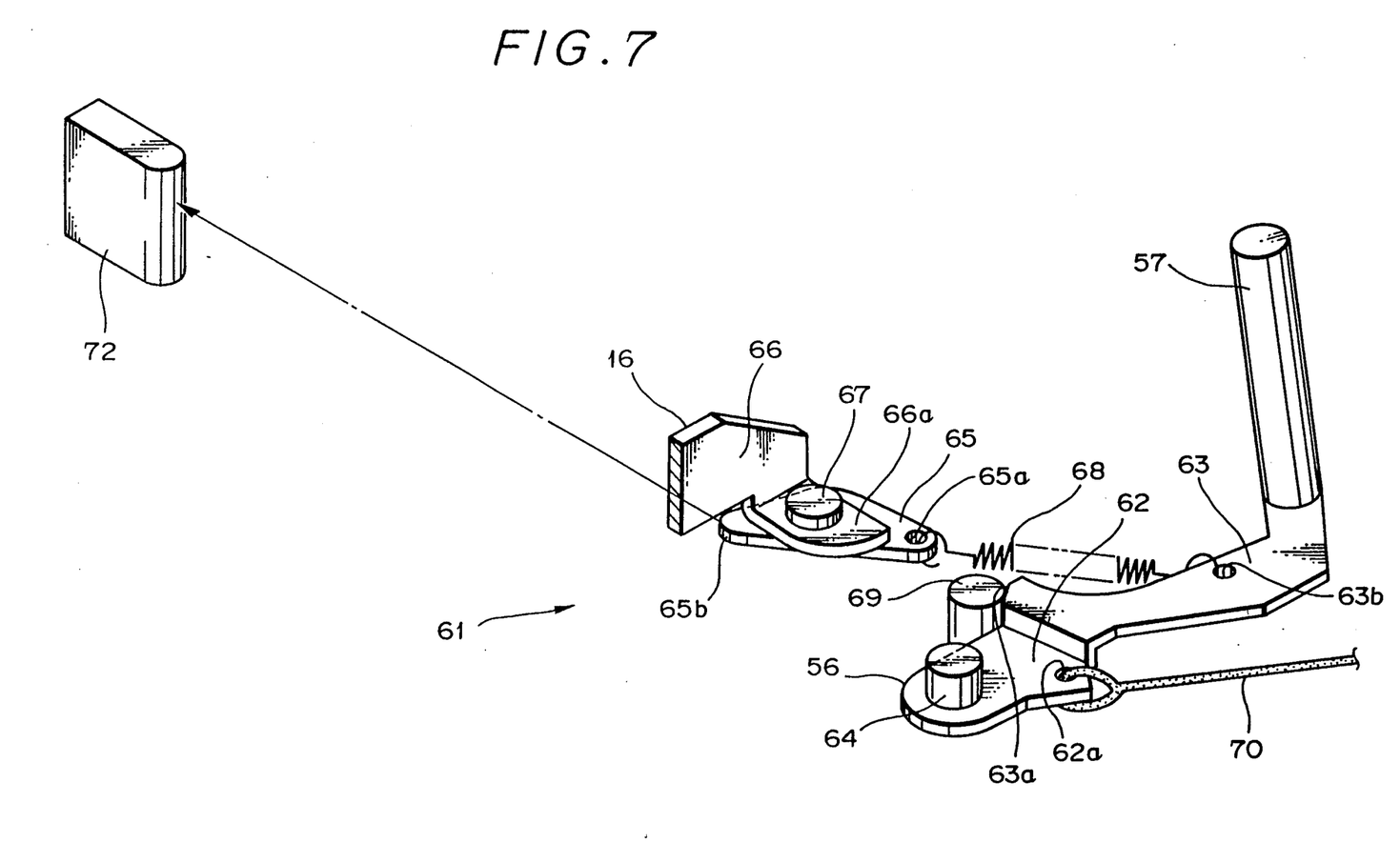
FIG. 7 is an enlarged fragmentary perspective view of another portion of the tape tensioning mechanism.
Figure 10:
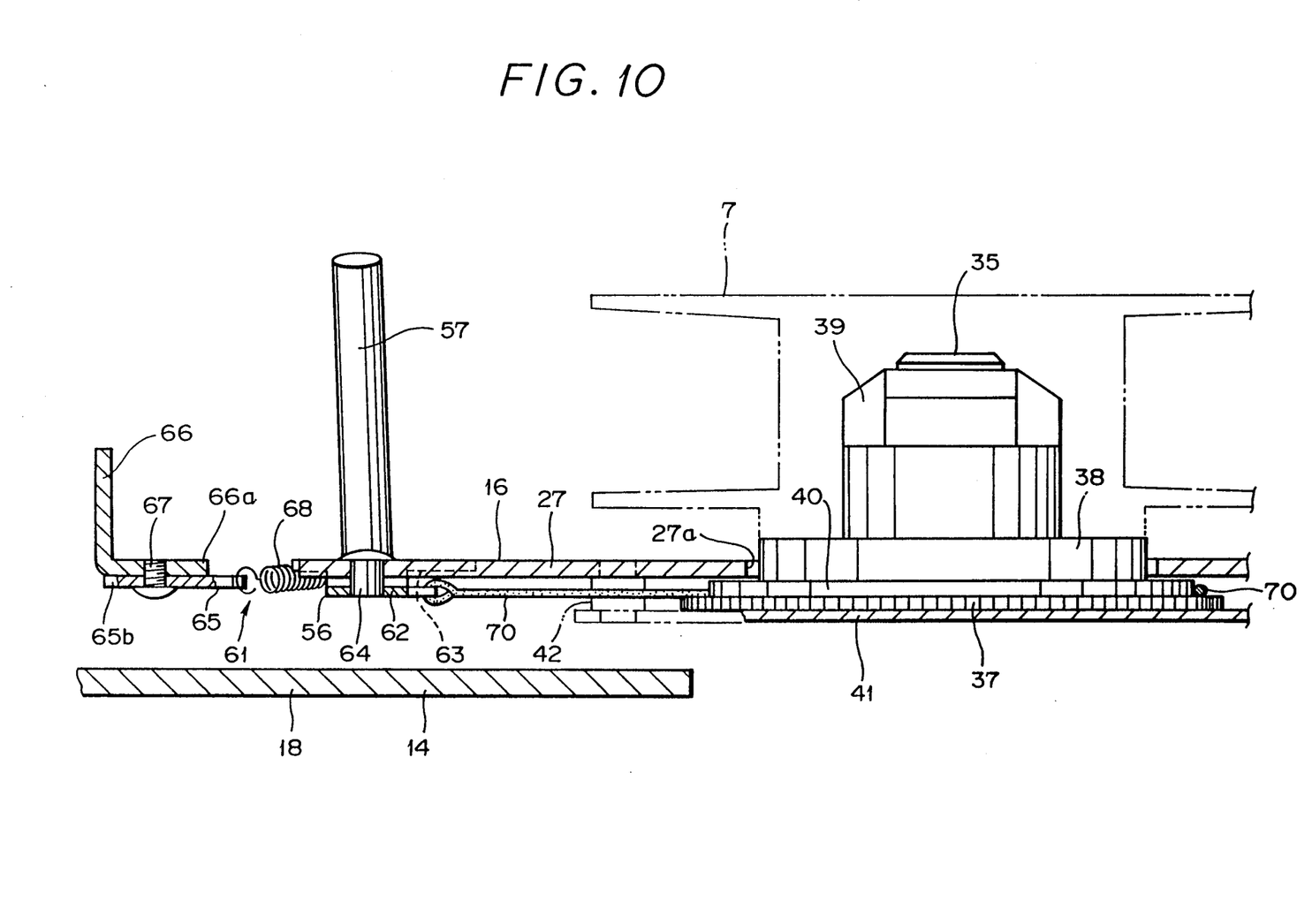
FIG. 10 is a cross-sectional view taken along line X—X of FIG. 8.

The tightening lever 65 is in the shape of a narrow flat strip of a relatively small size. The tightening lever 65 is angularly movably supported on the slidable chassis 16 behind the lefthand end 62 of the tensioning lever 56. Specifically, as shown in FIG. 7, a support wing 66 projects to the right from the rear end of the left side wall 28 of the slidable chassis 16, and a horizontal lever support arm 66a projects forwardly from the lower edge of the distal end of the support wing 66. A support shaft 67 projects downwardly from a substantially central area of the lever support arm 66a, as shown in FIG. 10. The tightening lever 65 has an intermediate portion rotatably supported by the support shaft 67. The tightening lever 65 lies at substantially the same height as the portion 63 of the tensioning arm 56. The tightening lever 65 has a spring retainer hole 65a defined in an end thereof.

The tension spring 68 normally urges the tensioning arm 56 to turn counterclockwise when the magnetic tape 6 has been loaded. One end of the tension spring 68 engages in the spring retainer hole 63b of the tensioning arm 56, and the other end in the spring retainer hole 65a of the tightening lever 65.

Figure 8:
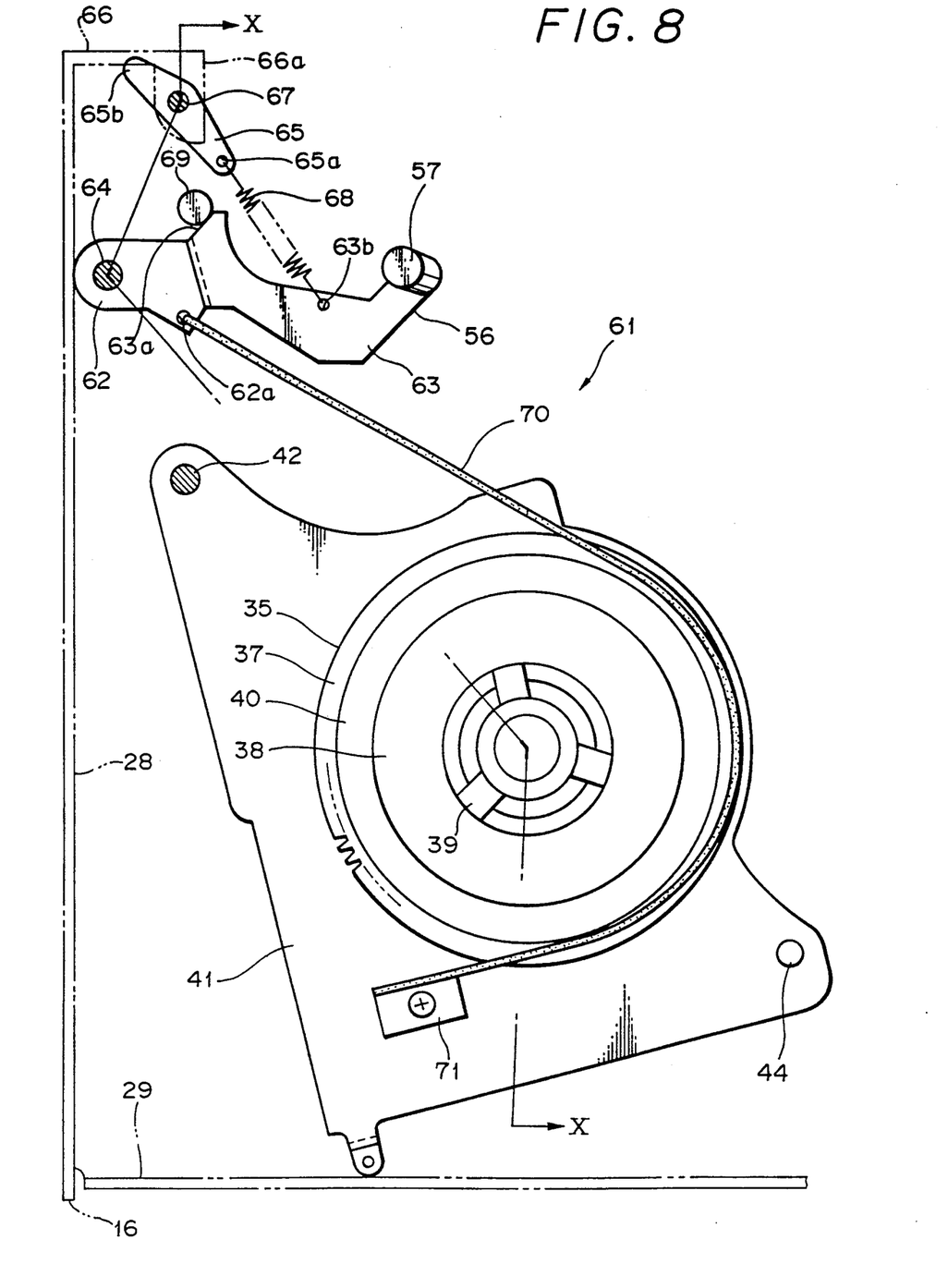
FIG. 8 is an enlarged plan view of the tape tensioning mechanism which is in an initial state.
Figure 9:
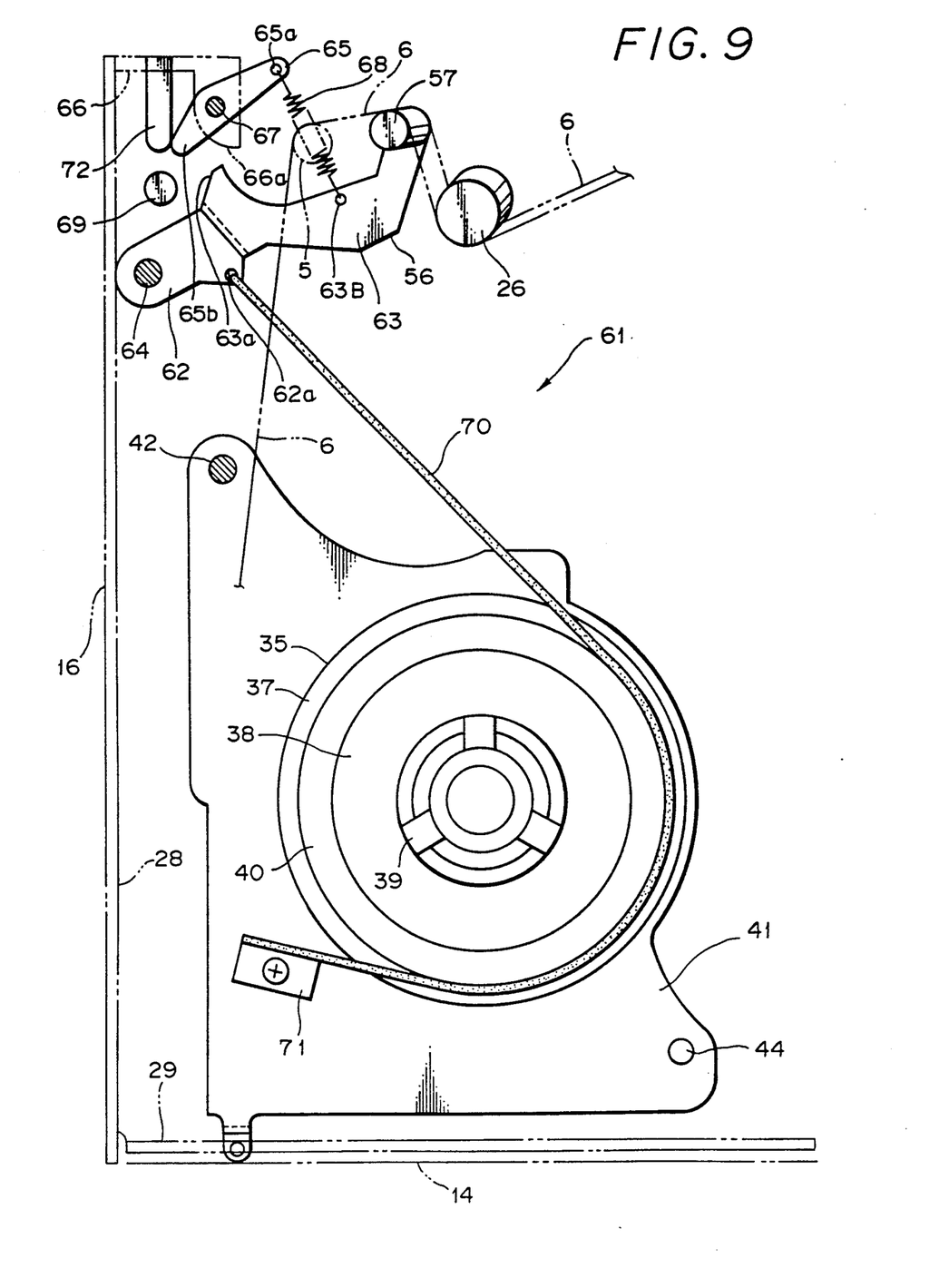
FIG. 9 is an enlarged plan view of the tape tensioning mechanism after the magnetic tape has been loaded.

The tensioning arm 56 is positionally controlled by a control pin 69 in the initial state. The control pin 69 is movable by a control mechanism which operates according to the movement of the slidable chassis 16 relative to the fixed chassis 14. In the initial state, the control pin 69 is held in a position (hereinafter referred to as a "control position") substantially rearwardly and rightwardly of the pivoted end of the tensioning arm 56, as shown in FIG. 8. After the slidable chassis 16 starts moving toward the retracted position and before it reaches the retracted position, the control pin 69 moves to a position (hereinafter referred to as a "release position") which is slightly leftward of the control position, as shown in FIG. 9.

When the control pin 69 is in the control position, the tensioning arm 56 is prevented from turning counterclockwise by the edge 63a abutting against the control pin 69, as shown in FIG. 8. In this position, the tightening lever 65 is angularly positioned such that a straight line passing through the support shaft 67 and the spring retainer hole 65a extends also through the spring retainer hole 63b of the tensioning arm 58. The tension spring 68 is kept slightly taut against loosening, thereby holding the tensioning arm 56 and the tightening lever 65 in position. Thus, in the initial state, the tensioning arm 56 extends substantially laterally with respect to the slidable chassis 16, holding the tensioning pin 57 in an initial position on the lefthand side of the left tape loading block 48. The tightening lever 65 is held in a standby position, extending obliquely to the right in the forward direction substantially in alignment with the tension spring 68.

Figure 6:
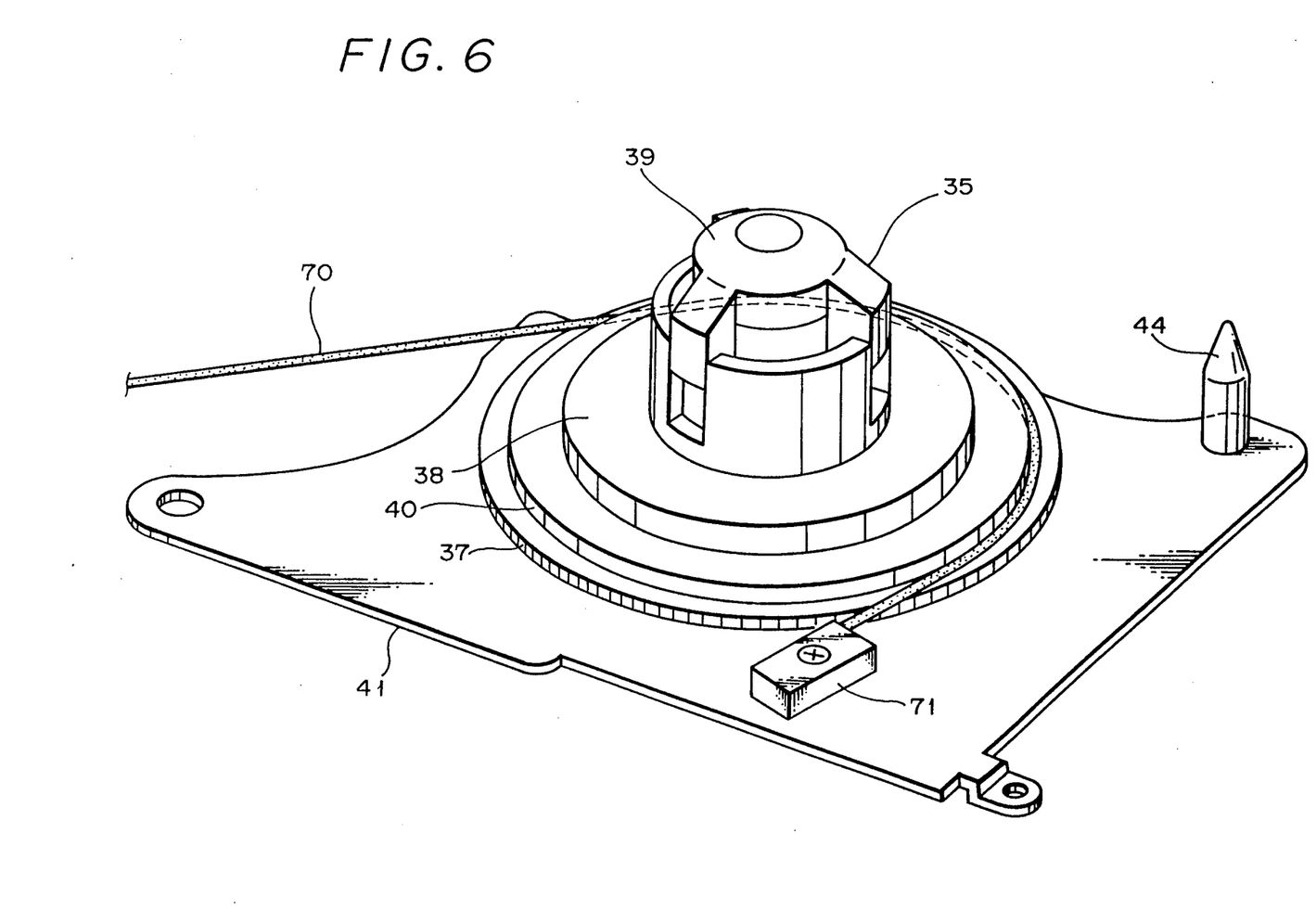
FIG. 6 is an enlarged fragmentary perspective view of a portion of the tape tensioning mechanism.

The tensioning band 70, which is in the form of through the band coupling hole 62a and the other end fixed to a band fixing member 71 mounted on the reel base lever 41, as shown in FIG. 6. The tensioning band 70 has an intermediate portion wound around a righthand side of the brake drum 40 of the reel base 35.

The tensioning band 70 has a length such that when the tensioning arm 56 is in its initial position, the tensioning band 70 is not wound tightly, but loosely, around the brake drum 40.

The pusher 72 serves to push and turn the tightening lever 65 counterclockwise substantially at the same time that the magnetic tape 6 is fully loaded. The pusher 72 is fixed to the lefthand end of the rear end of the base panel 18 in alignment with a lefthand end 65b of the tightening lever 65 which is held in the standby position. The pusher 72 has an upper end lying at the same height as the tightening lever 65.

The tape tensioning mechanism 61 operates as follows:

As described above, since the control pin 69 moves to the release position a predetermined time after the slidable chassis 16 starts moving toward the retracted position, the tensioning arm 56 is released from the initial position before the slidable chassis 16 reaches the retracted position. Almost concurrent with the arrival of the slidable chassis 16 at the retracted position, the pusher 72 hits and pushes the end 65b of the tightening lever 65, turning the tightening lever 65 counterclockwise. Since the other end of the tightening lever 65 which is engaged by the tension spring 68 is displaced rearwardly, the tension spring 68 is pulled, turning the tensioning arm 56 counterclockwise thereby to bring the tensioning pin 57 into contact with the magnetic tape 6. The tensioning pin 57 is held in contact with the magnetic tape 6 resiliently under the tension of the tension spring 68, as shown in FIG. 9. Therefore, the magnetic tape 6 is tensioned by the tensioning pin 57 under the tension of the tension spring 68.

The tightening lever 65 is urged to turn clockwise by the tension spring 68, but prevented from turning clockwise by engagement with the pusher 72.

The tension spring 68 is almost not tightened in the initial state, but is tightened by the tightening lever 65 turned by the pusher 72 only when the magnetic tape 6 is fully loaded. Therefore, the tension spring 68 is not required to be strong and large in size, but may be relatively weak and small in size. As a result, the tape tensioning adjusting mechanism 61 may also be relatively small in size.

When the tensioning arm 56 is turned counter-clockwise under the bias of the tension spring 68, the end of the tensioning band 70 which is coupled to the tensioning arm 56 is moved substantially rearwardly. Thus, the tensioning band 70 is also tightened, causing its intermediate portion to be wound tightly around the brake drum 40.

When the tension of the magnetic tape 6 thus loaded fluctuates, the tensioning arm 56 is angularly displaced to tighten or loosen the tensioning band 70 for thereby controlling the load on the reel base 35 to vary the tension of the magnetic tape 6. The tape tensioning mechanism 61 according to the present invention therefore operates in the same manner as the conventional tape tensioning mechanism a for keeping the tension of the magnetic tape 6 constant while the magnetic tape 6 is being transported.

When the magnetic tape 6 is unloaded, the tightening lever 65 is released, and the tension spring 68 is loosened, allowing the tensioning arm 56 to move back to the initial position. More specifically, to unload the magnetic tape 6, the slidable chassis 16 is moved forwardly from the retracted position toward the projected position. Therefore, the pusher 72 is moved backwards with respect to the tightening lever 65, releasing the tightening lever 65. The tightening lever 65 is turned clockwise under the tension of the tension spring 68, which is loosened. The control pin 69 is displaced into the control position to return the tensioning arm 56 to the initial position.

Since the tensioning pin 57 is slightly inclined, it is effective to displace the magnetic tape 6 vertically when the magnetic tape 6 has been fully loaded. Therefore, the number of oblique tape guides required may be reduced. More specifically, the start-of-winding position on the head drum assembly 21 is slightly higher than the tape outlets 4 of the tape cassette 2 which is placed in the space 58 in the slidable chassis 16. Therefore, the tape path between the left tape outlet 4 and the start-of-winding position on the head drum assembly 21 is inclined progressively upwardly toward the head drum assembly 21. A certain number of oblique tape guides are required along the tape path to reduce the gradient of the inclined tape path. Since the tensioning pin 57 which has a primary function to tension the magnetic tape 6 doubles as an oblique tape guide, the number of dedicated oblique tape guides and the space in which they are located may be reduced, resulting in a reduction in the size of the video tape recorder 1.

In the above embodiment, the tightening lever 65 is rotatably supported on the slidable chassis 16, and the pusher 72 is fixed to the fixed chassis 14 for movement with respect to the tightening lever 65 to push the tightening lever 65 when the magnetic tape 6 is loaded. When the magnetic tape 6 is not loaded, the tightening lever 65 is held in an angular position not to tighten the tension spring 68 by the tensioning pin 57 in the initial position and the tension spring 68. When the magnetic tape 6 is loaded, the tightening lever 65 is pushed by the pusher 72 to turn into another angular position to tighten the tension spring 68. The tightening lever 65 is thus controlled in angular position by a highly simple mechanism.

Having described a preferred embodiment of the invention with reference to the accompanying drawings, it is to be understood that the invention is not limited to that precise embodiment and that various changes and modifications could be effected by one skilled in the art without departing from the spirit or scope of the invention as defined in the appended claims.

What is claimed is:

1. A tape tensioning mechanism for tensioning a tape drawn out of a tape cassette, comprising:
   a fixed chassis;
   a movable chassis movably mounted on said fixed chassis and movable in a forward and rearward direction with respect to said fixed chassis, said rearward direction being a retracted position;
   guide means on said fixed and movable chassis for defining a predetermined tape path to load said tape therein when said movable chassis is moved in said rearward direction into said retracted position;
   a tensioning arm rotatably mounted on said movable chassis and having a tensioning pin mounted thereon for contacting said tape to tension said tape when said tape has been loaded in said predetermined tape path defined by said movable chassis moving rearwardly into said retracted position;
   a tightening lever rotatably supported on said movable chassis for bringing said tensioning arm in contact with said tape;
   a tension spring for urging said tensioning arm in a direction to bring said tensioning pin into contact with said tape, said tension spring having one end coupled to said tensioning arm and an opposite end coupled to said tightening lever; an
   pushing means mounted on said fixed chassis for engaging and rotating said tightening lever to tighten said tension sprig as said tape is loaded in said predetermined tape path when said movable chassis is moved into said retracted position, and for releasing said tightening lever to loosen said tension spring when said movable chassis is out of said retracted position, wherein said pushing means comprises a pusher fixedly mounted on said fixed chassis and positioned to push an end of said tightening lever not coupled to said tension spring to rotate the tightening lever to tighten said tension spring when said movable chassis is moved into said retracted position.

2. A tape tensioning mechanism according to claim 1, wherein said tensioning pin is mounted on said tensioning arm in an inclined relationship thereto.

3. A tape tensioning mechanism according to claim 1, further comprising a support wing affixed to said movable chassis and a support shaft affixed to said support wing for rotatably supporting said tightening lever on said movable chassis.

4. A tape tensioning mechanism according to claim 1, wherein said tightening lever is in the form of a narrow, flat strip.

* * * * *

UNITED STATES PATENT AND TRADEMARK OFFICE
CERTIFICATE OF CORRECTION

PATENT NO. : 5,305,162
DATED      : April 19, 1994
INVENTOR(S) : Sunao Kushiro, Masato Yamaguchi, Keisuke Ikegami and Kenichi Fukahori It is certified that error appears in the above-indentified patent and that said Letters Patent is hereby corrected as shown below:

In the Abstract, line 4, change "Chassis" to --chassis--
Col. 2, line 15, change "g" to --q--
    line 51, change "g" to --q--
Col. 7, line 24, change "elongate" to --elongated--
    line 27, change "elongate" to --elongated--
    line 34, change "angularly movably" to --rotatably--
    line 37, after "into" insert --the retracted position, the reel base levers 41, 41' are--
Col. 9, line 24, change "move" to --moves--
    line 27, change "move" to --moves--
Col. 11, line 1, change "angularly movable" to --rotatably--
    line 54, after "of" insert --a string, has one end coupled to the tensioning arm 56--
Col. 12, line 36, change "counter-clock" to --counterclock--

In the claims:

Col. 14, line 20, change "an" to --and--
        line 23, change "sprig" to --spring--

Signed and Sealed this

Eighteenth Day of August, 1998

*Attest:*

BRUCE LEHMAN

*Attesting Officer*      *Commissioner of Patents and Trademarks*